United States Patent [19]

Losack

[11] Patent Number: 5,302,287
[45] Date of Patent: Apr. 12, 1994

[54] METHOD FOR ON SITE CLEANING OF SOIL CONTAMINATED WITH METAL COMPOUNDS, SULFIDES AND CYANOGEN DERIVATIVES

[75] Inventor: Billy J. Losack, Hondo, Tex.

[73] Assignee: Tuboscope Vetco International, Houston, Tex.

[21] Appl. No.: 943,819

[22] Filed: Sep. 11, 1992

[51] Int. Cl.$^5$ .............................................. C02F 1/58
[52] U.S. Cl. ...................... 210/612; 210/631; 210/747; 210/759; 210/904; 210/912; 134/42; 405/128
[58] Field of Search ............... 210/610–612, 210/621, 631, 669, 694, 721, 747, 749, 751, 759, 765, 766, 904, 912; 134/26, 29, 42; 405/128

[56] References Cited

U.S. PATENT DOCUMENTS

| | | | |
|---|---|---|---|
| 2,969,294 | 1/1961 | Shyne | 117/119.2 |
| 4,021,338 | 5/1977 | Harkin | 210/747 |
| 4,460,292 | 7/1984 | Durham et al. | 405/128 |
| 4,585,753 | 4/1986 | Scott et al. | 502/401 |
| 4,588,506 | 5/1986 | Raymond et al. | 210/631 |
| 4,591,443 | 5/1986 | Brown et al. | 210/747 |
| 4,749,491 | 6/1988 | Lawes et al. | 210/759 |
| 4,778,628 | 10/1988 | Saha et al. | 405/128 |
| 4,780,239 | 10/1988 | Snyder et al. | 210/679 |
| 4,781,944 | 11/1988 | Jones | 405/129 |
| 4,789,475 | 12/1988 | Harte et al. | 201/912 |
| 4,844,807 | 7/1989 | Manchak, Jr. | 210/747 |
| 4,998,848 | 3/1991 | Hansen | 405/128 |

*Primary Examiner*—Thomas Wyse
*Attorney, Agent, or Firm*—Finnegan, Henderson, Farabow, Garrett & Dunner

[57] ABSTRACT

An in situ method of cleaning soil and/or water contaminated with a contaminant comprising one or more compounds selected from the group consisting of metal compounds, sulfur compounds and cyanide compounds comprises breaking up contaminated soil, admixing soil with water and a biodegradable detergent in a proportion effective to obtain an aqueous slurry where the soil, any contaminant and the detergent interact to form contaminant-detergent formations, allowing the slurry to stand under conditions effective to permit any contaminant-detergent formations to rise in the aqueous slurry, separating the contaminant-detergent formations from the aqueous slurry now comprising partially decontaminated soil and water, separating the soil from the water, repeating the cleaning and separation steps until the soil has less contaminant than a predetermined value, typically a 80–90% decrease, admixing the soil having a lower contamination level with water and an activating agent for microorganisms capable of removing the contaminants, the agent being capable of generating $H_2O_2$ in solution, allowing the activating agent to interact with the soil microorganisms in the aqueous mixture under conditions effective to further remove contaminants remaining therein, separating the activating agent-treated soil from the aqueous mixture comprising the microorganisms, washing the separated soil and returning it to the original site, separating the contaminated water from the decontaminant laden microorganisms, and recycling the decontamined water into the system or returning it to the environment.

20 Claims, No Drawings

METHOD FOR ON SITE CLEANING OF SOIL CONTAMINATED WITH METAL COMPOUNDS, SULFIDES AND CYANOGEN DERIVATIVES

BACKGROUND OF THE INVENTION

1. Field of the Invention

This invention relates to an in situ method of cleaning soil, particularly sand, gravel, clay, and the like, and aqueous solutions such as water, that have been contaminated with, e.g., metal ions such as lead, chromium, silver and the like, sulfur-containing compounds, cyanide-containing compounds, and the like. The method relies on the formation of an aqueous slurry, the addition in separate steps of a detergent and an additive to promote the growth of indigenous microorganisms, and the regulation of the temperature at which these steps are conducted to thereby reduce the presence of metals, sulfur compounds, cyanide compounds and/or other contaminants in the soil and/or water. The extraction of these and other contaminants with the detergent may be repeated until their content is reduced to a level such that the remaining amount may be removed by concentration and/or adsorption and/or degradation by microorganisms indigenous to the soil and/or water.

2. Description of the Background

Various methods have been employed in the past to remove contaminants from contaminated solids such as soil. U.S. Pat. No. 4,781,944 to Jones describes a method and apparatus for detoxifying heavy metals such as chromium, arsenic, barium, cadmium, lead, mercury, selenium, silver, nickel, zinc, copper, and others, from contaminated soil, sludge, ashes, and the like. The method fixes the metals with carbon. It does so by heating a soil sample with a carbon-containing material to a temperature below the temperature for complete volatilization of most heavy metals while inhibiting the formation of oxides to produce a carbon bonded metal char residue, then cooling the char residue in the absence of air to insure that the residue will not combust, and then cooling to ambient temperature. The thus obtained residue is non-leachable since it heats to encapsulate the heavy metals by bonding to a carbon material. The metals are affixed to the carbon which may then be disposed of (see, column 4, lines 21-28 and 53-62 of Jones for description of combustion conditions and pyrolysis chamber).

U.S. Pat. No. 4,789,475 to Harte et al. discloses a method for treating a bed material with chelating agents and the use of this agent to remove a broad range of toxic chemicals from drinking water. The bed material is preferably granulated activated charcoal and the treated bed material is utilized in a water filtration device. Chelating agents, such as EDTA, are embedded in the bed material by application of a polymer/chelating agent-containing solution to the charcoal, rinsing and drying the bed material, treating it with an acidic solution and rinsing and drying.

U.S. Pat. No. 4,998,848 to Hansen describes an in situ method and apparatus for removing gaseous or vaporizable contaminants from a solid material without wholesale removal of the contaminated material. A perforated container with granules of charcoal providing a large surface for adsorption is inserted in the contaminated soil area. A cryogenic liquid, such as liquid nitrogen, is introduced in the container to cool the granules. The removal of contaminants from the soil is then accomplished by allowing for the gaseous or vaporized contaminants to flow out of the ground and into the container's perforations. The contaminants are thus adsorbed onto the cooled surface of the charcoal, and the container is removed from the ground when approaching saturation.

U.S. Pat. No. 4,460,292 to Durham et al. has claims limited to an in situ method of containing a contaminated liquid such as waste, hazardous liquids, drilling muds and chemicals by absorbing it into biogenetic silica. However, in the patent, it is indicated that the silica may contain a wide variety of additives such as carbon or activated charcoal (see, column 3, lines 28-32). The biogenetic silica is applied, whether alone or with additives, to the surface of the liquids in bulk or in contained form, such as in pellets. It may be added by gravity or sprayed onto or into the liquids, with or without mixing (see, column 3, lines 39-45).

U.S. Pat. No. 4,585,753 to Scott et al. relates to an aqueous suspension of activated charcoal for use as an in situ agricultural spray. The suspension contains, in addition, a wetting and suspending agent consisting of octylphenoxy(polyethoxyethanol) and a defoaming agent.

U.S. Pat. No. 4,778,628 to Saha et al. discloses and claims a method of disposing waste material that comprises forming a recessed area within the earth, lining it with a layer of zeolite, lining the zeolite with a layer of activated carbonaceous material to form a container, placing the waste material within the cavity, adding a second layer of activated carbonaceous material onto the waste material and a second layer of zeolite thereon. The entire contaminated soil area is buried inside an underground waste barrier structure.

U.S. Pat. No. 4,780,239 to Snyder et al. relates to a method of making an ion-exchange material by implanting an element such as carbon into a ceramic material and oxidizing the carbon to carboxylate or carbonate.

U.S. Pat. No. 2,969,294 to Shyne discloses and claims a method of uniformly extracting uranium into a graphite body to form a fuel block for a homogeneous, graphite-moderated nuclear research reactor.

A study published by the U.S. Department of Commerce (National Technical Information Service No. PB84-123637) funded by the United States Environmental Protection Agency and conducted by Rexnord, Inc. discusses requirements for mobile systems to extract spilled hazardous materials from excavated soils. The study lists the characteristics necessary for an effective extraction fluid. Chief among these characteristics is a solvent possessing low volatility at ambient conditions. A volatile solvent under ambient conditions, such as aqueous ammonia, is not considered a suitable extraction fluid by the above study to decontaminate soil.

Accordingly, there is still a need for a simple and effective method for cleaning contaminated soil such as gravel, sand, clay, and the like, and water, contaminated with metal compounds, sulfur compounds, including sulfhydric acid, and cyanide compounds, that may be easily conducted at the site of a spill and provide a significant reduction in the levels of metal ions such as heavy metal ions, sulfur compounds and cyanide compounds in the soil and in surface and subterranean water layers.

SUMMARY OF THE INVENTION

This invention relates to an in situ method of cleaning soil and/or water contaminated with a contaminant comprising one or more compounds selected from the group consisting of metal compounds, sulfur compounds and cyanide compounds, the method comprising (a) breaking up contaminated soil;

(b) admixing the soil with water and a biodegradable detergent in a proportion effective to obtain an aqueous slurry wherein the soil, any contaminant present, and the detergent interact to form contaminant-detergent formations;

(c) allowing the slurry to stand under conditions effective to permit any contaminant-detergent formations to rise in the aqueous slurry;

(d) separating the contaminant-detergent formations from the aqueous slurry which now comprises partially decontaminated soil and water;

(e) separating the partially decontaminated soil from the water;

(f) repeating steps (b) through (e) until the contaminant content of the soil becomes lower than a predetermined value;

(g) admixing an activating agent for promoting the growth of contaminant accumulating, adsorbing or degrading indigenous microorganisms with the lower contaminant-containing soil and water, the activating agent being capable of generating $H_2O_2$ in solution;

(h) allowing the microorganisms to interact with the aqueous mixture comprising the activating agent under conditions effective to substantially accumulate or adsorb therewithin or degrade contaminant remaining therein;

(i) separating the activating agent-treated soil from the aqueous mixture comprising the contaminant laden microorganisms and the activating agent;

(j) washing the separated soil and returning it to the environment;

(k) separating decontaminated water obtained in step (e) from the contaminant laden microorganisms; and (l) recycling the decontaminated water into step (b) or step (g) or returning it to the environment.

The method of the invention may be implemented by using an apparatus, preferably transportable to the site, suitable for cleaning soil and water contaminated with metal ions, such as lead, chromium, silver, and the like, as well as sulfur compounds, including $SH_2$ produced, e.g., in oil wells, cyanide compounds, and the like.

A more complete appreciation of the invention and many of the attendant advantages thereof will be readily perceived as the same becomes better understood by reference to the following detailed description.

DESCRIPTION OF THE PREFERRED EMBODIMENTS

This invention arose from a desire by the inventor to provide a method for cleaning spills of hydrocarbons, halogenated compounds such as polychlorinated biphenyls (PCBs), sulfur compounds such as sulfates, sulfites, sulfur trioxide, sulfur dioxide, tetrathionates, thiosulfates, sulfides, sulfhydric acid, and derivatives thereof such as sulfur containing organic compounds, and the like, cyanide compounds such as hydrogen cyanide, cyanide salts, derivatives thereof such as organic cyanides, and the like, and metal compounds containing one or more metal ions such as lead, chromium, arsenic, nickel, barium, zinc, silver, gold, mercury, copper, and the like, and provide a means for decontamination and bioremediation of soil, particularly sandy soil, gravel or clay, and water, for other uses.

Previously, the present inventor provided a cost-effective, rapid and environmentally sound method for treating soil and water contaminated with many types of petroleum, halogenated hydrocarbons, such as PCBS, polyalkyleneglycols and other oxygenated contaminants, and organic solvents, among others. The conditions, elements and other information for the practice of the method for decontaminating soil and/or water contaminated with petroleum, halogenated hydrocarbons, and the like, was described by the present inventor in co-pending U.S. patent application Ser. No. 07/934,358 entitled "Method and Apparatus for On The Site Cleaning of Contaminated Soil" filed Aug. 20, 1992. The text of the co-pending application relating to conditions, proportions of components and other parameters associated with the method of biocleaning soil or water contaminated with these organic materials and to an apparatus described therein that is relevant to the practice of the present method is incorporated herein by reference.

Unexpectedly, the present inventor also found that by first mixing a detergent with contaminated water or soil and subsequently stimulating the growth of microorganisms present in the contaminated soil or water, in addition to removing organic materials such as hydrocarbons, halogenated organic materials, solvents and the like, a substantial portion of metal ions present in the soil or water as well as sulfur and cyanide compounds present therein could also be removed.

After repeated and thorough testing the present method in various soils, the inventor has now completed the present invention. Thus, the inventor's method has been proven to lower the level of metal, sulfur and cyanogen content in soil and water to levels that are sufficiently low to be acceptable under Government standards applied to the improvement of environmentally compromised sites such as those where oil spills have occurred or where industrial or other chemicals have been discarded into the environment without containment. The present method has been shown to lower the content of metals, sulfur and cyanide to an acceptable level in a matter of days. Yet, the present cleaning and bioremediation system is far less costly than other methods of soil clean-up and lacks the liability associated with landfilling.

The method of this invention offers the following advantages, among others, when compared to other soil decontamination methods.

(a) Significant cost savings over thermal treatments or off-site landfilling.

(b) Slurry mixing ensures that all contaminated soil particles are exposed to bacteria.

(c) No foreign microbes are required but may be added.

(d) Elimination of liability associated with landfilling.

(e) Curing time is often shorter than other biological treatment processes.

This invention, thus, provides an in situ method of cleaning soil and water contaminated with a contaminant comprising one or more compounds selected from the group consisting of metals, sulfur compounds and cyanide compounds, the method comprising (a) breaking up contaminated soil;

(b) admixing the soil with water and a biodegradable detergent in a proportion effective to obtain an aqueous slurry wherein the soil, any contaminant present, and the detergent interact to form contaminant-detergent formations;

(c) allowing the slurry to stand under conditions effective to permit any contaminant-detergent formations to rise in the aqueous slurry;

(d) separating the contaminant-detergent formations from the aqueous slurry which now comprises partially decontaminated soil and water;

(e) separating the partially decontaminated soil from the water;

(f) repeating steps (b) through (e) until the contaminant content of the soil becomes lower than a predetermined value;

(g) admixing an activating agent for promoting the growth of contaminant-accumulating, adsorbing or degrading indigenous microorganisms with the lower contaminant-containing soil and water, the agent being capable of generating $H_2O_2$ in solution;

(h) allowing the microorganisms to interact with the aqueous mixture comprising the microorganism activating agent under conditions effective to substantially adsorb, accumulate or degrade any contaminant remaining therein;

(i) separating the activating agent-treated soil from the aqueous mixture comprising contaminant laden microorganisms and the activating agent;

(j) washing the separated soil and returning it to the environment;

(k) separating the contaminated water obtained in step (e) from the contaminant laden microorganisms; and (l) recycling the decontaminated water into step (b) or step (g), or returning it to the environment.

The present method may be practiced by using a unit positioned next to a contaminated area such that the contaminated soil is transported a small distance to, and introduced into, a soil breaking container through its input means, e.g., by means of a hopper. The method may be performed in batches, and in another preferred embodiment, it is performed in a continuous mode. In yet another preferred embodiment, the method is performed in a mobile unit such as a trailer comprising one or more reactors. The mobile unit may be self-contained and fully equipped to begin soil treatment upon arrival at the site.

Any soil lumps present at the site may be broken up to a desired size. The soil may be reduced to a particle size of, e.g., less than about 1 inch, and optionally smaller sizes, utilizing means known in the art. Suitable means for breaking up the soil are grinders, strippers, tillers, hoes, disks and/or blades. The breaking up of the soil may be attained prior to loading it into the apparatus or with a means for breaking up soil incorporated therein. The broken up soil exits the container and is transported into a reactor where the remaining steps of the method continue.

If the soil is broken up at the site of contamination, it may then be loaded into the reactor and water and a biodegradable detergent added. Once the water and the biodegradable detergent or surfactant are added, the three components may be mixed under conditions effective for the formation of an aqueous slurry. This step may be allowed to proceed for a period of about 15 to 120 minutes, and more preferably about 30 to 60 minutes. The period of time selected will depend on the degree of contamination of the soil and the type of contaminant(s).

Within a few minutes of mixing, the surfactant or detergent starts to interact with contaminant(s) such as hydrocarbons and other organic molecules to form clusters or aggregates, and the aggregates are separated from the soil as they move up towards the surface of the slurry. Smaller compounds, gases and the like are entrapped and carried out of the soil and/or water in the clusters formed. The detergent-contaminant aggregates carrying the metals, sulfur and cyanogen compounds, in the form of a suspension, may be separated from the slurry and directed to a filtration unit to separate them from the water or be separated from the surface of the aqueous phase by froth flotation or other means of skimming. The contaminant-detergent formations may be pumped out of the reactor for subsequent treatment and/or biodegradation. The remaining water is then separated in the reactor from the partially decontaminated soil, passed through one or more filters comprising a bioactivated carbon scrubber, ionic resins, gravel, or combination thereof, optionally with the aid of a filter plate with substantially linear openings of alternate perpendicular orientation, and returned to the container. This filter plate is described by the present inventor in co-pending U.S. application Ser. No. 07/934,010 entitled "Filter Plate for Removing Hydrocarbons and Other Contaminants from Aqueous Solutions and Gases", filed Aug. 20, 1992, U.S. Pat. No. 5,290,45. Any portions thereof relating to the manufacture, characteristics and uses of the filter plate relevant to the practice of this invention are incorporated herein by reference.

Detergents suitable for use in this invention are preferably biodegradable and non-toxic to indigenous soil microorganisms or to any contaminant-removing microorganisms added in the process. Accordingly, the detergent of this invention will neither inhibit microorganisms or their effectiveness in subsequent bioremediation steps nor be toxic to them. A biodegradable and non-toxic detergent, as the one used herein, will not persist in the rehabilitated soil, and will therefore not alter the further development of a population of soil organisms thereafter. As a result, rehabilitated soil will contain few by-products of the remediation process.

A suitable detergent may, in general, be natural or synthetic, and preferably comprises fatty acids, and may contain additives such as those utilized in fertilizers and humic acid. For example, additives such as phosphorous- and nitrogen-containing agents are suitable, as is potash. The detergent utilized herein acts as a surfactant to separate portions of the soil from the contaminants associated therewith. Suitable detergents for use herein are mild soaps. Many are commercially available products, however, not of the household laundering type. Suitable detergents for use herein are largely free of ammonia, ammonia producing compounds, compounds containing halogens such as chlorine, anti-microbial agents, disinfectants, other bleaches, alkaline agents and strong acids.

When placed in an aqueous medium, the detergents of this invention preferably yield a pH range of about 6 to 8. A pH greater than about 8 may be too basic for the microorganisms present in the soil to survive. The microorganisms may overeat the detergent and die. A pH lower than about 6 may be too acidic and kill the microorganisms. A preferred pH is about 6.5 to 7.5. These products are also preferably added as an aqueous solution of specific gravity about 1.5 to 2.5, and more preferably about 1.5 to 1.9. Examples of suitable detergents are manufactured by Calgon and Procter and Gamble as well as Omniclean ® and a line of detergents sold by Medina Agriculture Products Co., Inc (Hondo, Tex.). Other types of detergents or surfactants may be utilized as long as they do not contain lye as do many laundry detergents. However, any biodegradable detergent or surfactant which will interact with soil contaminant(s) such as oil, halogenated hydrocarbons, solvents, sulfur- and/ro cyanide-containing compounds, and the like, may be utilized.

The detergent or surfactant is provided for use herein preferably in solution, in an amount of about 10 to 90% in water or other biocompatible aqueous solution, and more preferably about 20 to 70%. The water added to the formation of the first slurry may be substantially decontaminated water or water obtained from a contaminated site, which was obtained from a surface or subsurface formation.

The proportion of detergent:soil:water is preferably about 0.1:6:100 to 10:10:10,000 gallons:yds$^3$:gallons, and more preferably about 0.8:7:500 to 2.5:9:5,000 gallons:yds$^3$:gallons.

The detergent or surfactant may be added in a final concentration that will vary depending on the concentration of contaminants, type and variety of contaminant, and soil characteristics.

Water added to the first slurry may be substantially decontaminated water or water obtained from a contaminated site, which was obtained from surface or subsurface formations.

The temperature for conducting the detergent step and the microorganism step should not exceed temperatures suitable for the growth and proliferation of the microorganisms. Typically, the temperature may be maintained at about 30° to 212° F., and more preferably about 40° to 120° F. These steps may be accompanied by mixing and/or shearing. In the case that exogenous microorganisms are added, the detergent step may be conducted at higher temperatures that may not permit the survival of the endogenous microorganisms. In addition, if thermophilic microorganisms are added, higher temperatures may also be utilized while the microorganisms are in the reaction mixture.

When the degree of contamination has been reduced to a desired level, e.g., less than about 20%, and more preferably to less than about 10%, then soil and water may be admixed with an activating agent for contaminant-removing microorganisms that are contained in the soil and/or water. The agent may, for example, comprise hydrogen peroxide, organic peroxides, and any material capable of generating $H_2O_2$ in solution, such as humic acid and, e.g., a fertilizer comprising nitrogen, phosphorus and potash.

The first detergent treatment of the present method occurs in a short period of time and may be completed in less than one hour. At the end of this step, contaminant reduction of more than about 70 to 80% may be attained.

Alternatively, the remaining soil may then be transferred to a second container where detergent or surfactant and water are added once again in similar proportions. A further reduction in the level of contaminants is attained herein. In a different embodiment, the first and the second detergent steps may be conducted in different or in the same container or reactor. The second time the detergent or surfactant is added, the proportion of detergent or surfactant needed will be substantially lower when compared to the first one. In general, the ratio of detergent to water and soil remains within the same range although less detergent may be added after the first time through. After two or more of these steps, a reduction in excess of about 80% of contaminants may be obtained, and in many instances up to about 90% and greater. However, costwise it is advisable to continue on to the following steps after an 80 and 90% decontamination level is achieved with the aid of the detergent or surfactant. Once the soil was subjected to repeated detergent treatments, it may be transferred to a different container, and a microorganism activating agent and water added to form a slurry. This invention thus provides a method for cleaning soil and water based on washing and bioremediation at the site of contamination.

Once the level of contaminant is reducted to 80 to 90%, the remaining contaminants may be removed by stimulating the growth of indegenous microorganisms. The method described herein employs an activating agent for contaminant-removing microorganisms comprising $H_2O_2$, or capable of generating this compound in solution. The activating agent comprises $H_2O_2$, organic peroxides or other $H_2O_2$ generating compounds that aid in the removal of the contaminants, and microorganism nutrients, and optionally substances that are essential for microorganism metabolism such as biological catalysts, soil conditioners and natural compounds to assist in the removal of contaminants. Examples of preparations suitable for use as the additive are solutions of $H_2O_2$, organic peroxides, humic acid, a fertilizer-like mixture comprising substances rich in nitrogen, phosphorus and potash, and the like.

In one preferred embodiment, the activating agent comprises organic peroxides, nutrients for the microorganisms and a fertilizer-like mixture. Suitably, the additive may be provided in solution. The solution may contain a broad concentration of the additive, e.g., about 10 to 70%, and more preferably about 20 to 45% thereof. The activating agent stimulates the growth of the indigenous soil microecology, including aerobic and anaerobic bacteria, spores, and other microbes. Overall, the components of the activating agent are added in amounts effective to improve the microbial growth and activity involved in decontamination of the soil and water. Care should be exercised to avoid exceeding these amounts and thereby slowing down the microorganisms, and to avoid including substances that will be toxic or lethal to the microorgansims. This treatment enhances the activities of microorganisms present in the soil and increases the effectiveness of the remediation process, broadening its effectiveness. No superbugs or bacteria foreign to the site are required, although in especially difficult applications they may be added, if desired.

The slurry may then be mixed, and air provided, e.g., under slight pressure, to aid the growth and actions on the contaminants by the aerobic microorganisms. Any fumes produced in the containers may be recirculated through a filter(s) such as carbon filters, and the like, and then returned to the container(s). The slurry may then be allowed to stand, optionally with mixing, for a period of time effective to allow a substantial breakdown of the soil and for the microorganisms to multiply until a ratio of, e.g., up to about one bacteria to one soil particle is attained. This one-to-one ratio establishes superior conditions for the total removal of the contaminants. Other ratios, however, may be satisfactorily utilized as well.

The activating agent may be added to the slurry preferably in a proportion of about 0.1 to 10 gallons of activating agent per about 100 to 10,000 gallons of water and about 6 to 10 yds$^3$ of soil.

Oxygen, such as in the form of air, may be added to the soil, and water mixture along with the activating agent. The microorganisms are allowed to interact with the aqueous mixture comprising the activating agent under conditions effective to substantially remove any contaminant remaining therein. Suitable conditions are temperatures of about 15° to 130° C., and more preferably about 30° to 42° C. and about 60° to 100° C., regulated by a heating means. This step may be accompanied by mixing in order to allow the oxygen to penetrate into the inner portions of the slurry. This permits the aerobic bacteria from the soil and/or water to become active in the removal of contaminants.

Suitably, microorganisms may also be added for the removal of the contaminant(s). Many microorganisms will take up and remove large quantities of various metal ions from the surrounding environment. Such microorganisms which are also capable of growing or surviving in the contaminated or partially decontaminated soil or water may be added to remove metal contaminants. Preferred is a mixture of different types of microorganisms, each type of microorganism being capable of taking up large amounts of particular heavy metals and in general concentrating them and/or adsorbing them to its cell wall and the like, the mixture collectively being capable of taking up and removing many kinds of heavy metals in the contaminated or partly decontaminated soil or water. Given that hydrogen sulfide and cyanide form stable complexes with the iron-porphyrin groups of some cytochromes, microorganisms possessing such cytochromes and capable of growing or surviving in the contaminated or partially decontaminated soil or water may be added to remove sulfide and cyanide contaminants. Most bacteria can form sulfide from sulfate on a small scale for biosynthetic purposes and sulfate-reducing bacteria (bacteria of the genus Desulfovibrio, for example) reduce sulfate, and other oxidized sulfur compounds, to sulfide on a large scale for energy production. Such oxidized sulfur compound-removing microorganisms capable of growing or surviving in the contaminated or partially decontaminated soil or water may be added to remove oxidized sulfur contaminants. Alternatively, mixtures of the above described microorganisms may be added. In another embodiment, the microorganisms may be selected from thermophilic variants of the above described microorganisms. Examples of the above described microorganisms are known in the art and need not be further described herein.

When the slurry is allowed to stand under conditions effective for the formation of contaminant-detergent aggregates and water and soil are allowed to stand in the presence of the activating agent so that the microorganisms may remove the contaminants remaining therein, these steps may be conducted with agitation and shearing.

At this point, the slurry may then be discharged to the site, or it may be placed on a lined curing bed and covered with, e.g., plastic, to allow for further action by microorganisms as described in co-pending U.S. patent application Ser. No. 07/934,111 by the present inventor entitled "Method and Apparatus for the On The Site Cleaning of Contaminated Soil", filed on Aug. 20, 1992. The contents of the copending application relating to the conditions, elements and other relevant information relating to the curing stage is incorporated herein by reference. The cover is intended to hold in moisture and to maintain a more or less constant temperature. The time needed for the soil and the activating agent in the curing bed depends upon the type and level of contaminant(s).

In cases of heavy contamination, microbial accumulation, adsoprtion and degradation of contaminants are allowed to continue for a period of time of, e.g., one month, and more preferably about 180 days. At the end of this time period, the activating agent-treated soil is separated from the aqueous mixture by means of carbon filters alone or in combination with other technology, or by other means known in the art. The soil separated from the microorganisms and the aqueous mixture may then be washed and returned to its natural habitat. The soil may then be further cured by covering the site with, e.g., a plastic, and providing moisture to allow further degradation of the contaminants by the microorganisms.

The water separated from the decontaminated soil may be filtered and recycled for further decontamination or returned to its natural habitat.

The removal of contaminant laden mircroorganisms and other contaminants from the water may be conducted by filtration with at least one filter such as a plate provided with T-shaped openings, or with alternate perpendicular slits or linear openings, charcoal or other carbon filters, gravel, ion-exchange resin(s), membrane(s) with sub-micron pores, or combinations thereof. In a preferred embodiment, the filtration is conducted at least twice with a filter comprising T-shaped openings or the perpendicular slits, prior to recycling the filtered water. In another preferred embodiment, activated carbon is used and more preferably a cascade of various activated carbon filters is utilized. In another preferred embodiment a cascade of three charcoal or activated carbon filters and gravel and at least one and up to three ion-exchange resin filters are used with or without the T-shaped opening filter plate or a filter plate having rows of alternate perpendicular linear openings.

Soils that may be treated by the present method are, e.g., sandy soils, particularly sand itself, clay and other types of soils such as gravel, limestone, tundra and glacierous sands and clays, humus and the like.

The present method may be applied to surface or underground contaminated soils and water. It may also be applied to clogged oil wells and other conditions where accumulation of contaminants exists. This method is particularly suited to permit the exit of sulfhydric acid and cyanide gases from oil wells where the extraction of petroleum stops due to clogging, and the like.

The method of this invention has been shown to achieve over about 92% metal ion reduction, such as in the case of lead contamination. This has been shown to occur within minutes with the detergent alone. When the additive, water and/or oxygen, are added, over about 99% contaminant reduction may be achieved within 1 to 2 months, and sometimes higher decontamination ratios such as a reduction in lead levels to about 0.05% of the original content.

The method comprises a detergent step described herein that may alone, in the absence of the bioremediation step, be sufficient to remove high levels of metals, sulfur compounds and/or cyanide compounds contaminating the soil and/or water. However, in order to reduce the level of metals, sulfides or cyanides below EPA set standards, the bioremediation step provides the refinement required to adsorb and/or concentrate these components by the microorganisms, thereby reducing the environmental levels of the contaminants to the desired low levels. The bioremediation step of the present method may alone, in the absence of the detergent step, be sufficient to remove low levels of contamination with petroleum, halogenated derivatives, metals, sulfur compounds and/or cyanide compounds from slightly contaminated soil and water.

The presence of contaminants may be tested by the EPA 8240 and EPA 6240 methods. Lead levels may be determined by the EPA 239.1 method, the total TCLP extraction values may be determined by the EPA 1331 method and the TPH values determined by the EPA 418.1 method utilizing infrared spectroscopy.

The present method may be practiced by using an apparatus suitable for in situ cleaning of soil and water contaminated with metal compounds, sulfur compounds, cyanide compounds, and the like. One such apparatus comprises a soil breaking container provided with soil input and output means and means for breaking up soil; a first container provided with first means for inputting soil, first means for outputting soil, first means for inputting water, first means for outputting water, first means for outputting contaminant-detergent formations, first means of mixing and moving the soil from the first soil input means to the first soil output means, first heating means, first skimming means, and first means for separating water from soil; a second container provided with second means for inputting soil, second means for outputting soil, second means for inputting water, second means for outputting water, second means for outputting contaminant-detergent formations, second means of mixing and moving the soil from the second soil inputting means to the second soil outputting means, second heating means, second skimming means, and second means for separating water from soil; a third container provided with third means for inputting soil, third means for inputting water, and means for inputting a microorganism activating agent, third means for outputting soil, third means for outputting water, third means of mixing and moving soil from the third soil input means to the third soil output means, third heating means, third skimming means, and third means for separating water from soil; a means for connecting the output means of the soil breaking container with the first soil input means, the breaking container connecting means being provided with a fourth means of moving soil from the breaking container output means to the first soil input means; a means for connecting the first soil output means with the second soil input means, the connecting means being provided with a fifth means of mixing and moving the soil from the first soil output means to the second soil input means; a means for connecting the second soil output means with the third soil input means, the connecting means provided with a sixth means of mixing and moving soil from the second soil output means to the third soil input means; a means for connecting the third water output means with the site of the contaminated water; means for returning substantially contaminant free soil to the situs, the soil returning means being connected to the third soil output means; at least one means for separating water from contaminants provided with water input and output means; at least one means for filtering water provided with water input and output means; means for connecting the output means of the at least one water/contaminant separation means with the input means of the at least one filtering means; a means for connecting the water output means of the first, second and third containers with the input means of the water/contaminant separation means; a means for connecting the output means of the at least one water filtering means with the water input means of the first, second and third containers for recirculating water; a means for circulating the water through the water connecting means, the at least one water/contaminant separation means, the at least one water filtering means and first, second and third containers; and a means for operating the circulating means, the heating means and the mixing and moving means.

One such apparatus was described by the present inventor in copending U.S. patent application Ser. No. 07/934,111 entitled "Method and Apparatus for On The Site Cleaning of Contaminated Soil", filed Aug. 20, 1992. The portions of the co-pending application relevant to the description and use of the apparatus are incorporated herein by reference.

Having now generally described this invention, the same will be better understood by reference to certain specific examples, which are included herein for purposes of illustration only and are not intended to be limiting of the invention or any embodiment thereof, unless so specified.

EXAMPLES

EXAMPLE 1

Treatment of Oil Contaminated Site

Various sites have been successfully treated with the process of the invention. In particular, the process of the invention has been particularly successful in treating soils contaminated with a variety of petroleum and chlorinated hydrocarbons.

In a West Texas project, a heavy oil contaminated site exhibited a total petroleum hydrocarbon (TPH) level of 66,000 ppm. This soil was excavated and processed by the present method for 30 minutes and then staged for curing.

The detergent utilized was Bio-S (Medina Agriculture Products Co., Inc., Hondo, Tex.), and it was added in a proportion of 1:4:500 (gallons:yd$^3$:gallons) to the soil and water. The activating agent used was a Soil Activator (Medina Agriculture Products Co., Inc., Hondo, Tex.), and it was used in a proportion to a Bio-D fertilizer (Medina Agriculture Products Co., Inc., Hondo, Tex.), and Hydrocarbon Degrading Bacteria (Medina Agriculture Products Co., Inc., Hondo, Tex.) of 1:½:¼ (quart: pint: lbs).

Within 48 hours the TPH level of the soil was reduced by 90% to approximately 6,700 ppm as shown in FIG. 1. Continued contaminant reduction to below laboratory limits was accomplished in less than a month.

EXAMPLE 2

Treatment of First Lead Contaminated Site

Various soils contaminated with lead compounds have been successfully treated with the process of the invention. In an Alaska project, lead contaminated soil exhibited a total lead level of 4150 mg/kg of soil.

This soil was excavated and processed by the present method for 90 minutes (samples were taken after 30 minutes, 60 minutes and 90 minutes of processing) and then staged for curing.

The detergent utilized was Bio-S (Medina Agriculture Products Co., Inc., Hondo, Tex.), and it was added in a proportion of 1:4:500 (gallons:yd$^3$:gallons) to the soil and water. The activating agent used was a Soil Activator (Medina Agriculture Products Co., Inc., Hondo, Tex.), and it was used in a proportion to a Bio-D fertilizer (Medina Agriculture Products Co., Inc., Hondo, Tex.), and Hydrocarbon Degrading Bacteria (Medina Agriculture Products Co., Inc., Hondo, Tex.) of 1:½:¼ (quart: pint: lbs).

The total lead content of the soil was reduced by 66%, 72% and 78% after 30 minutes, 60 minutes and 90 minutes of processing, respectively. 24 hours of curing the processed soil reduced the soil's total lead content to 370 mg total lead/kg of soil, achieving a 91% reduction of the total lead level found in the untreated soil. The data are shown in Table 1 below.

TABLE 1

| Sampling Time | Lead Content of Samples Total Lead Content (mg Pb/kg soil) |
|---|---|
| untreated | 4150 |
| 30 min | 1415 |
| 60 min | 1175 |
| 90 min | 900 |
| 24 hours | 370 |

Total lead levels were determined by the EPA 239.1 method.

EXAMPLE 3

Treatment of Second Lead Contaminated Site

In another Alaska project, a lead contaminated site exhibiting a total lead level of 27,400 parts per million (ppm) was selected for treatment by the present process.

The detergent utilized was Bio-S (Medina Agriculture Products Co., Inc., Hondo, Tex.), and it was added in a proportion of 1:4:500 (g:yd$^3$: g) to the soil and water. The activating agent used was a Soil Activator (Medina Agriculture Products Co., Inc., Hondo, Tex.), and it was used in a proportion to a Bio-D fertilizer (Medina Agriculture Products Co., Inc., Hondo, Tex.), and Hydrocarbon Degrading Bacteria (Medina Agriculture Products Co., Inc., Hondo, Tex.) of 1:½:¼ (quart: pint: lbs).

After treating the contaminated soil with the present method for only 30 minutes, the total lead level was reduced by 86% to 3860 ppm as shown in Table 2 below.

TABLE 2

| Test Results Before & After Treatment | |
|---|---|
| Sample Description | Total Lead Content (ppm) |
| before treatment | 27,400 |
| after treatment | 3,860 |

Total lead levels in solids/soils were determined by EPA methods 3050/7420. Total lead levels in water were determined by EPA methods 3005/7420.

EXAMPLE 4

Treatment of First Lead and Oil Contaminated Site

In yet another Alaska project, a soil contaminated with both lead and oil was selected for treatment. The soil exhibited a total petroleum hydrocarbon (TPH) level of 550 mg TPH/kg of soil, a total lead level of 7.6 mg Pb/kg of soil, and a TCLP extracted lead level of 2.4 mg Pb/kg of soil. This soil was excavated and processed by the present method for 120 minutes, and samples were taken after 55 minutes, 90 minutes and 120 minutes of processing.

The detergent utilized was Bio-S (Medina Agriculture Products Co., Inc., Hondo, Tex.), and it was added in a proportion of 1:4:500 (gallons:yd$^3$:gallons) to the soil and water. The activating agent used was a Soil Activator (Medina Agriculture Products Co., Inc., Hondo, Tex.), and it was used in a proportion to a Bio-D fertilizer (Medina Agriculture Products Co., Inc., Hondo, Tex.), and Hydrocarbon Degrading Bacteria (Medina Agriculture Products Co., Inc., Hondo, Tex.) of 1:½:¼ (quart: pint: lbs).

The total lead content of the soil was reduced by greater than 36%, 68% and 91% after 55 minutes, 90 minutes and 120 minutes of processing, respectively. The TCLP extracted lead content of the soil was reduced by greater than 50%, 63% and 75% after 55 minutes, 90 minutes and 120 minutes of processing, respectively. The TPH content of the soil was reduced by greater than 46%, 56% and 68% after 55 minutes, 90 minutes and 120 minutes of processing, respectively. The data are shown in Table 3 below.

TABLE 3

| Sampling Time (min) | Lead and TPH Content of Samples | | |
|---|---|---|---|
| | Total Lead Content (mg Pb/kg soil) | TCLP Lead Content (mg Pg/kg soil) | TPH Content (mg TPH/kg soil) |
| untreated | 7.6 | 2.4 | 550 |
| 55 | 4.9 | 1.2 | 298 |
| 90 | 2.4 | 0.9 | 240 |
| 20 | 0.7 | 0.6 | 175 |

Lead levels were determined by the EPA 239.1 method, TCLP extraction was performed by the EPA 1331 method, and TPH levels were determined by the EPA 418.1 method.

EXAMPLE 5

Treatment of Second Lead and Oil Contaminated Site

In a further Alaska project, a lead and oil contaminated site exhibiting a total petroleum hydrocarbon (TPH) level of 2800 mg TPH/kg soil and a total lead level of 30 mg Pb/kg soil was selected for treatment by the present process. This soil was excavated and processed by the present method for 30 minutes.

The detergent utilized was Bio-S (Medina Agriculture Products Co., Inc., Hondo, Tex.), and it was added in a proportion of 1:4:500 (g:yd$^3$:g) to the soil and water. The activating agent used was a Soil Activator (Medina Agriculture Products Co., Inc., Hondo, Tex.), and it was used in a proportion to a Bio-D fertilizer (Medina Agriculture Products Co., Inc., Hondo, Tex.), and Hydrocarbon Degrading Bacteria (Medina Agriculture Products Co., Inc., Hondo, Tex.) of 1:½:¼ (quart: pint: lbs).

As shown below in Table 4 below, after 30 minutes of treating the contaminated soil with the present method, the total lead level, the lead level as measured by TCLP extracted lead and the TPH level of the soil were reduced by 83%, 13% and 19%, respectively.

TABLE 4

Test Results Before & After Treatment

| Sampling Time (min) | Total Lead Content (mg Pb/kg soil) | TCLP Lead Concent (mg Pg/kg soil) | TPH Content (mg TPH/kg soil) |
|---|---|---|---|
| untreated | 30 | 0.8 | 2800 |
| 30 min | 5.2 | 0.7 | 2280 |

Total lead levels were determined by the EPA 239.1 method, and TPH levels were determined by the EPA 418.1 method.

Further processing in accordance to this invention lowered the levels of lead and TPH even further.

EXAMPLE 6

Treatment of Third Lead and Oil Contaminated Site

In an additional Alaska project, a lead and oil contaminated site exhibiting a total petroleum hydrocarbon (TPH) content of 13400 mg TPH/kg of soil, a total lead level of 61 mg Pb/kg of soil and a TCLP extracted lead level of 6.3 mg Pb/kg of soil was selected for treatment by the present process. This soil was excavated and processed by the present method for 120 minutes, and samples were taken after 65 minutes, 90 minutes and 120 minutes of processing.

The detergent utilized was Bio-S (Medina Agriculture Products Co., Inc., Hondo, Tex.), and it was added in a proportion of 1:4:500 (g:yd$^3$:g) to the soil and water. The activating agent used was a Soil Activator (Medina Agriculture Products Co., Inc., Hondo, Tex.), and it was used in a proportion to a Bio-D fertilizer (Medina Agriculture Products Co., Inc., Hondo, Tex.), and Hydrocarbon Degrading Bacteria (Medina Agriculture Products Co., Inc., Hondo, Tex.) of 1:½:¼ (quart: pint: lbs).

The TPH content of the soil was reduced by greater than 66%, 72% and 74% after 65 minutes, 90 minutes and 120 minutes of processing, respectively. The total lead level of the soil was reduced by greater than 11%, 41% and 70% after 65 minutes, 90 minutes and 120 minutes of processing, respectively. The lead content of the soil as measured by the TCLP extracted lead declined by greater than 35%, 44% and 54% after 65 minutes, 90 minutes and 120 minutes of processing, respectively. The data are shown in Table 5 below.

TABLE 5

Lead and TPH Content of Samples

| Sampling Time (min) | Total Lead Content (mg Pb/kg soil) | TCLP Lead Concent (mg Pg/kg soil) | TPH Content (mg TPH/kg soil) |
|---|---|---|---|
| untreated | 61 | 6.3 | 13400 |
| 65 | 54 | 4.1 | 4500 |
| 90 | 36.1 | 3.5 | 3700 |
| 120 | 18.0 | 2.9 | 3510 |

Lead levels were determined by the EPA 239.1 method, TCLP extraction was performed by the EPA 1331 method, and TPH levels were determined by the EPA 418.1 method.

EXAMPLE 7

Treatment of Chromium Contaminated Soil

In an area surrounding a chrome-plating company, chromium contaminated soil exhibiting a TCLP extracted chromium level of 5,660 parts per million (ppm) was selected for treatment by the present process. The soil was excavated and processed by the present method for 50 minutes.

The detergent utilized was Bio-S (Medina Agriculture Products Co., Inc., Hondo, Tex.), and it was added in a proportion of 1:4:500 (g:yd$^3$:g) to the soil and water. The activating agent used was a Soil Activator (Medina Agriculture Products Co., Inc., Hondo, Tex.), and it was used in a proportion to a Bio-D fertilizer (Medina Agriculture Products Co., Inc., Hondo, Tex.), and Hydrocarbon Degrading Bacteria (Medina Agriculture Products Co., Inc., Hondo, Tex.) of 1:½:¼ (quart: pint: lbs).

After 50 minutes of treating the contaminated soil with the present method, the TCLP extracted chromium level was reduced by 57% to 2,460 ppm.

EXAMPLE 8

Treatment of Copper Contaminated Water

Water from the city of Rusk in east Texas exhibiting a TCLP extracted copper level of 0.05 parts per million (ppm) was selected for treatment by the present process. The water was collected and processed by the present method for 15 minutes.

The detergent utilized was Bio-S (Medina Agriculture Products Co., Inc., Hondo, Tex.), and it was added in a proportion of 1:4:500 (g:yd$^3$:g) to the soil and water. The activating agent used was a Soil Activator (Medina Agriculture Products Co., Inc., Hondo, Tex.), and it was used in a proportion to a Bio-D fertilizer (Medina Agriculture Products Co., Inc., Hondo, Tex.), and Hydrocarbon Degrading Bacteria (Medina Agriculture Products Co., Inc., Hondo, Tex.) of 1:½:¼ (quart: pint: lbs).

After 15 minutes of treating the water with the present method, the TCLP extracted copper level was reduced by 60% to 0.02 ppm.

The invention now being fully described it will be apparent to one of ordinary skill in the art that many changes and modifications may be made thereto without departing from the spirit or scope of the invention as set forth herein.

What is claimed as novel in United States Letters Patent is:

1. An in situ method of cleaning soil and/or water contaminated with a contaminant comprising one or more compounds selected from the group consisting of metal compounds, sulfur compounds and cyanide compounds, the method comprising
   (a) breaking up contaminated soil;
   (b) admixing soil with water and a biodegradable detergent in a proportion effective to obtain an aqueous slurry wherein the soil, any contaminant present, and the detergent interact to form contaminant-detergent formations;
   (c) allowing the slurry to stand under conditions effective to permit any contaminant-detergent formations to rise in the aqueous slurry;
   (d) separating the contaminant-detergent formations from the aqueous slurry which now comprises partially decontaminated soil and water;
   (e) separating the partially decontaminated soil from the water;
   (f) repeating steps (b) through (e) until the content of contaminant of the soil becomes lower than a predetermined value;
   (g) admixing an activating agent for promoting the growth of contaminant -accumulating, -adsorbing or -degrading indigenous microorganisms with the lower contaminant-containing soil and water, the agent being capable of generating $H_2O_2$ in solution;

(h) allowing the microorganisms to interact with the aqueous mixture comprising the activating agent under conditions effective to substantially accumulate or adsorb therewithin, or degrade, any contaminant remaining therein;

(i) separating the activating agent-treated soil from the aqueous mixture comprising the contaminant laden microorganisms and the activating agent;

(j) washing the separated soil and returning it to the environment;

(k) separating decontaminated water obtained in step (e) from the contaminant laden microorganisms; and (l) recycling the decontaminated water into step (b) or step (g) or returning it to the environment.

2. The method of claim 1, wherein step (k) is conducted by filtering the contaminated water with a filtering means selected from the group consisting of a filter plate provided with substantially linear openings of alternate perpendicular orientation, charcoal, gravel, ion-exchange resins, and combinations thereof.

3. The method of claim 2, wherein step (k) is conducted at least twice by filtering with a filter plate provided with substantially linear openings of alternate perpendicular orientation supporting a filtering material prior to step (l).

4. The method of claim 2, wherein step (k) is constructed by filtering the contaminated water through gravel, charcoal and ion-exchange resins and a filter plate comprising substantially linear openings of alternate perpendicular orientation.

5. The method of claim 4, wherein the gravel, charcoal and resins are placed on the same of different filter plates in the same or different container through which the contaminated water is circulated.

6. The method of claim 1, wherein steps (c) and (h) are conducted with agitation and shearing.

7. The method of claim 1, wherein step (b) is conducted at a temperature of about 30° to 212° F.; and step (c) is conducted at a temperature of about 30° to 212° F.

8. The method of claim 1, wherein step (g) is conducted at a temperature of about 30° to 212° F.; and step (h) is conducted at a temperature of about 30° to 212° F.

9. The method of claim 1, wherein steps (b) and (g) are conducted with agitation and shearing.

10. The method of claim 1, wherein the soil comprises sand, gravel, clay or a mixture thereof.

11. The method of claim 1, wherein the biodegradable detergent is added in step (b) as a liquid solution or suspension comprising a mild fatty acid, compounds comprising nitrogen and phosphorous, and potash.

12. The method of claim 1, wherein the biodegradable detergent is provided as an aqueous composition having a specific gravity of about 1.5 to 1.9, and a pH of about 6 to 8.

13. The method of claim 1, wherein step (g) further comprises adding a microorganism selected from the group consisting of microorganisms capable of removing metal compounds, sulfur compounds or cyanide compounds from the surrounding environment, thermophilic mutants thereof and mixtures thereof.

14. The method of claim 13, wherein the added microorganisms are capable of absorbing and/or accumulating metals from the surrounding environment.

15. The method of claim 14, wherein the metals the microorganisms are capable of absorbing and/or accumulating are selected from the group consisting of lead, chromium, arsenic, barium, cadmium, mercury, selenium, silver, nickel, zinc, and copper.

16. The method of claim 13, wherein the added microorganisms are capable of absorbing, accumulating and/or metabolizing sulfur- or cyanide-containing compounds.

17. The method of claim 1, wherein the activating agent added in step (g) comprises a compound selected from the group consisting of $H_2O_2$, organic peroxides, humic acid, potash, nitrogen- and phosphorus- containing compounds, and mixtures thereof.

18. The method of claim 1, wherein step (h) is conducted in the presence of air or oxygen.

19. The method of claim 1, further comprising covering the soil returned to the environment in step (j) to keep moisture and warmth in; and allowing for the microorganisms to further act on the contaminants.

20. The method of claim 1, wherein the biodegradable detergent added in step (b) further comprises humic acid, a fertilizer-type mixture or mixtures thereof.

* * * * *